Aug. 6, 1929.  A. L. DAVIS  1,723,769
METHOD OF PRODUCING HEADED METAL ARTICLES
Filed Nov. 18, 1925   2 Sheets-Sheet 1
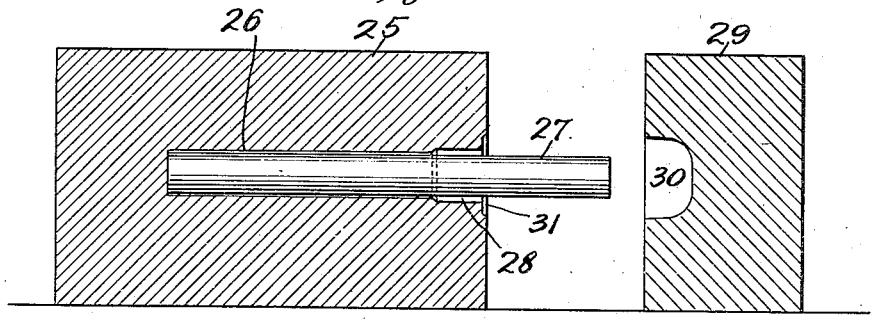
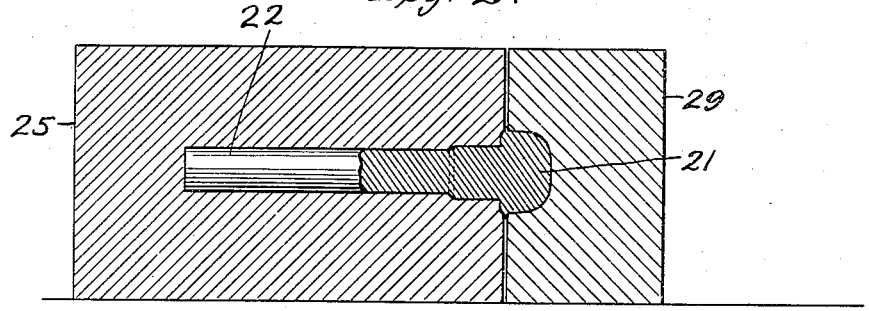
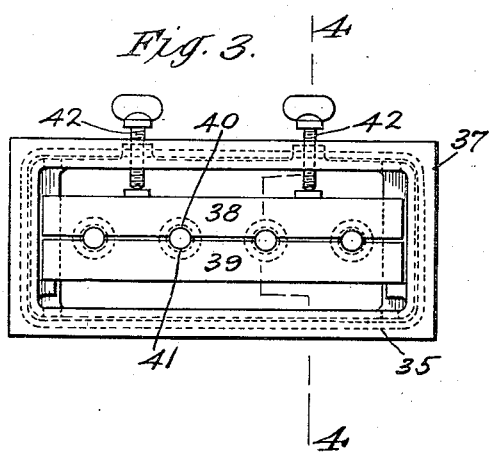
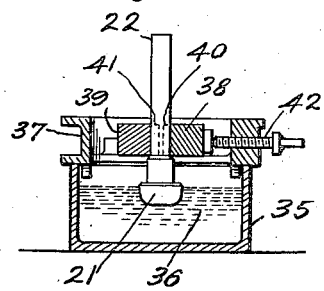
Inventor
Alvan L. Davis
By his Attorneys Patented Aug. 6, 1929.

1,723,769

UNITED STATES PATENT OFFICE.

ALVAN L. DAVIS, OF WATERBURY, CONNECTICUT, ASSIGNOR TO SCOVILL MANUFACTURING COMPANY, OF WATERBURY, CONNECTICUT, A CORPORATION OF CONNECTICUT.

METHOD OF PRODUCING HEADED METAL ARTICLES.

Application filed November 18, 1925. Serial No. 69,813.

This invention relates to a method of producing headed metal articles such as cap screws or bolts.

According to an approved practice of manufacturing cap screws or bolts, cold drawn wire stock is upset to form a headed blank and the head of the blank thus produced is then shaped to be engaged by a tool, for example, by cutting facets thereon. Cap screws or bolts so formed, however, are frequently characterized by a brittleness of the metal in the head which renders the head liable to break. Moreover, these cut facets are not always true and there is a considerable loss in waste metal due to the cutting.

It is an object of the present invention to provide an improved method of producing headed articles such as cap screws or bolts such that the heads are tough and strong; such that the facets in screws having faceted heads are uniformly true and capable of resisting deformation under the application of a wrench or other tool; and such that the production may be carried out economically.

With these and other objects in view the invention consists in the method which will first be described in connection with the accompanying drawings and then more particularly pointed out.

In the drawings:

Figure 1 is a sectional view of die means for carrying out the step of heading a slug;

Figure 2 is a similar view showing the parts at the end of the heading operation;

Figure 3 is a top plan view of apparatus for carrying out the step of annealing the heads of the blanks;

Figure 4 is a sectional view taken on the broken line 4—4 of Fig. 3.

According to the method of the present invention, a blank having a head and a stem is formed by upsetting the end of cold drawn wire stock. This may be accomplished in various ways. For example, a suitable length may be cut from wire stock and one end thereof upset in a die header. An example of such a header is hereinafter described.

While the shape of the head may vary, in carrying out the invention according to the best practice, the head of the blank will be in the form of a truncated cone having a curved shoulder between the substantially flat top face of the head and the side of the cone, the base of the cone adjoining the stem of the blank. Such a head may be conveniently described as a mushroom shaped head.

Figure 6:
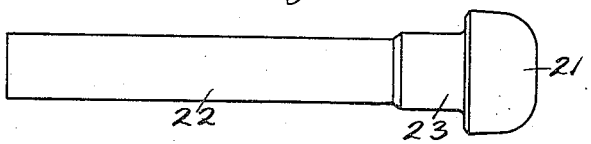
Figure 6 is a plan view of a headed blank prior to shaping the head.
Figure 7:
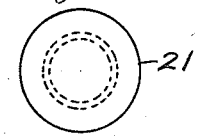
Figure 7 is an end view of the same.

A headed blank such as described is illustrated in Fig. 6 by way of example, this blank being designed for the production of a ½″ hexagon steel cap screw, U. S. standard, the threading to be done by the method disclosed in a patent to F. J. Senior, No. 1,649,929. This blank has a mushroom shaped head 21 and a stem comprising a shank 22 to be threaded and a shoulder 23 sufficiently over-size to permit machining to true diameter. In this connection it is noted that cap screws or bolts ordinarily have a threaded shank and an unthreaded shoulder between shank and head which has thread-crest diameter. When the thread is formed by die rolling, as in the Senior method referred to, the metal of the shank is displaced outwardly by the threading dies. Consequently the shoulder of the blank has a diameter larger than the shank of the blank by the amount of this metal displacement.

The head 21 is in the form of a truncated cone, the base of which has a diameter slightly larger than the diagonal of the hexagon to be formed. The slope of the cone is at an angle which may vary between 3° and 7°, and the side of the cone is connected with the substantially flat top by a curved shoulder having a radius of from 1/16" to 3/8". The height of this head between the bottom and top faces is approximately that of the height of the head of the finished blank.

For other sizes the general size of the head will vary substantially in proportion to the size of the screw to be produced. The angle of the slope of the side of the head will remain about the same and while the radius of curvature between the side and top may remain substantially the same it may vary slightly in proportion to the size. For other types of cap screws the head of the blank will vary depending on the head of the screw to be produced. For example, for hexagon cap screws of S. A. E. standard the head of the blank will be lower and the curve somewhat sharper between the cone and the top.

As later set forth, the head of the cap screw is shaped by a metal drawing operation. With a blank such as that described a hexagon shape can be drawn that has smooth, true facets without any fin; the blank can be drawn to hexagon form without removing any stock, that is, the hexagon is formed entirely by metal flow; there is enough metal available to fill in the corners of the hexagon but not so much as to cause tearing; and there is a minimum amount of waste metal to be trimmed off after shaping.

While the headed blank may be formed in various ways, it may be accomplished by means of the upsetting die header illustrated in the accompanying drawings. Referring to Fig. 1, a stationary die 25 has a chamber 26 for receiving part of a length 27 of wire stock. The forward end of this chamber opens into a die chamber 28 somewhat larger than the stock diameter. This die chamber is of the configuration of the desired stem shoulder 23. Cooperating with the die element 25 is a movable upsetting header die 29 having a die chamber 30 coaxial with the die chamber 28 and having the shape of the head to be formed, e. g. the mushroom head above described. In the face of the die element 25 is a shallow die recess 31 that forms the base of the head. The length of stock or slug 27 being positioned in the stationary die, as shown in Fig. 1, the movable die 29 is advanced, by any suitable means, against the end of the slug. This causes upsetting of the metal of the slug into die chamber 28 to form the shoulder 23, and into die chambers 30, 31 to form the head 21 of the blank. Fig. 2 shows the parts at the end of the heading operation, resulting in the headed blank described.

In carrying out the invention in its entirety, the head of the blank is heated to relieve the stresses and strains which have been set up in the metal by the cold upsetting, without injuriously heating the stem to modify substantially the characteristics of the metal in the stem which have been induced in it by the cold drawing and which it is desirable to retain because of the increase in the strength of the stem.

In carrying the invention into effect, and referring as an example to the treatment of a blank for a bolt or cap screw which has been formed from cold drawn steel stock and with a cold upset head thereon, the head itself is treated in such manner that the head will be raised to the desired temperature without heating of the stem to change substantially its characteristics. The temperature to which the head is raised will be sufficient to relieve the stresses and strains which have been set up in the metal by the cold upsetting and will vary according to the character of the metal. In such a blank as that referred to, the temperature will usually vary within what is known as the annealing range, that is, from around 1300° F. to around 1700° F. according to the characteristics of the metal of the blank.

This annealing of the head of the blank may be accomplished in various ways and it may be conveniently done by immersing the head in molten lead. For example, the head of the blank may be lowered into a bath of molten lead until about 7/8 of the head is immersed and retained until the head is given a red heat without raising the remainder of the blank beyond a black heat. The bath should be at such a temperature and the blank should be immersed for such a period of time that the head will be heated to a temperature within the annealing range referred to without sufficient heat being conducted to the stem to change substantially its characteristics. It is considered advisable to keep the surface of the bath covered with granular charcoal to avoid undue oxidation.

The accompanying drawings illustrate an example of apparatus capable of carrying out this step of annealing the head. Referring to Figs. 3 and 4, a vessel 35 contains a molten lead bath 36 which is kept at the requisite temperature in any suitable manner. Cooperating with the vessel 35 is a blank holder comprising a frame 37 arranged to be suspended on the rim of vessel 35. Extending across the frame 37 are two complementary clamping elements 38, 39, having registering notches 40, 41 for receiving the stem of blanks. One of the clamping elements is slidable in the frame and is forced toward the other element by set screws 42. A number of blanks being clamped in the holder, the latter is suspended on the rim of the vessel 35 with the heads of the blanks immersed in the bath as described. The extent of immersion can be controlled by the relative position of the blanks in the holder or by the level of the bath.

The annealing of the head above described results in a recrystallization of the bulk of the grains in the metal in the head so that they are no longer in the laminated or schistose condition resulting from the upsetting of the metal to form the head. They more nearly approach an equiaxed condition. This reconversion or recrystallization of the grains strengthens or toughens the head and removes the condition of brittleness which existed after the heading and before annealing. By confining the annealing to the head, the stem of the blank is not injuriously heated to modify substantially the structure produced by cold drawing the stock. As a result the head is relatively soft and tough while the stem has the desired tensile strength.

Figure 8:
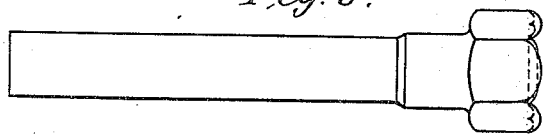
Figure 8 is a plan view of the blank after the head has been subjected to one metal drawing operation.
Figure 9:
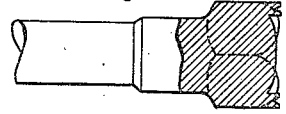
Figure 9 is a view showing part of Fig. 8 in section.
Figure 13:
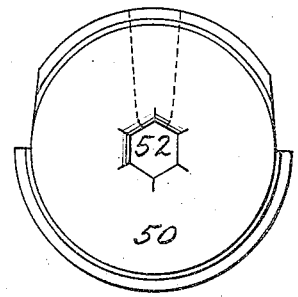
Figure 13 is a face view (reduced) of the leading draw die of Fig. 5.
Figure 10:
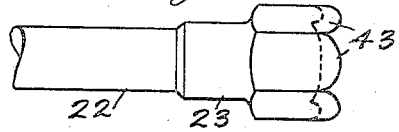
Figure 10 is a plan view of the blank after the head has been subjected to a second metal drawing operation.
Figure 11:
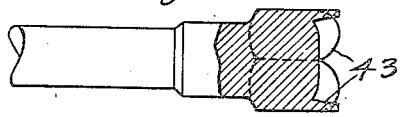
Figure 11 is a view showing part of Fig. 10 in section.

In carrying out the invention in its entirety the blank, having its head annealed, is cold worked to shape the head for engagement by a tool and to harden the outer surface thereof. This may conveniently be accomplished by a metal drawing operation. In carrying out this step in what is now considered the most advantageous manner, the blank will be subjected to a plurality of drawing operations, each succeeding operation bringing the head nearer to final shape. For example, by a suitable draw die the head may be drawn to approximately final shape and a second draw die may complete the head formation. While the shape of the head may vary, the drawings illustrate a hexagon head and the invention in its entirety includes the formation of a hexagon head in connection with the mushroom shaped blank head above described. This blank (Fig. 6) may be drawn to the desired hexagon shape by two successive draws. In effecting the drawing operation, the head is subjected to the action of a hexagon draw die with the base of the head foremost. As the metal drawing action progresses the metal of the head is worked into hexagon shape. With the blank described there is more metal presented at the start than at the finish. As a result, there is, at the start, just enough metal to fill out, or substantially fill out, the corners, and the sloping off of the head compensates for the accumulation of metal as the shaping progresses. Figs. 8 and 9 illustrate the result of one drawing operation. The metal of the head of the blank has been worked into a hexagon shape slightly larger than final size and subject to possible slight irregularities and imperfections in facets and corners. This drawn head is then subjected to a second drawing operation which draws it down to final size. This second draw serves also to fill out any irregularities or deficiencies in the corners and to obliterate any imperfections in the facets. Figs. 10 and 11 illustrate the result of the second drawing operation. By this operation the head has been drawn down to final size and the consequent metal flow has filled up the corners, if necessary, and obliterated any irregularities or imperfections that may have existed in the facets after the first draw.

As a result of this cold working, such as the drawing operations described, not only is the head shaped to be engaged by a tool, e. g. a hexagon shape, but in addition the grains or crystals of the metal of the outer surface of the head, e. g. the facets, and to some extent behind this surface, are again elongated to have somewhat the characteristics of the metal of the stem. The resulting product has, therefore, a soft, tough head capable of resisting a tendency to split or crack but with a relatively hard outer surface, e. g. facets, capable of resisting deformation under the application of a wrench or other tool.

While the metal drawing of the blank may be carried out by various means it may conveniently be accomplished by means of the apparatus hereinafter described.

In forming the hexagon head by one or more drawing operations as just described, it will be noted that the head is shaped entirely by metal flow and without the removal of any metal. There is, however, in the drawn head here illustrated, a small amount of waste metal that requires trimming. As the metal is drawn into hexagon shape, the metal flows toward the top of the head and forms burrs or prongs as exemplified at 43 (Fig. 11). These are removed by any suitable shaving operation. The nature of the shaving operation depends on the type of head desired. For the U. S. standard head referred to, with a rounded or dome-shaped top face, the shaving operation not only removes the burrs or prongs 43 but gives the head the rounded top referred to. The drawn blank described has a head that is scalloped slightly at the bottom, as indicated in Fig. 11. The finished blank has a flat bottom face and the shaving step, therefore, includes shaving down the bottom face of the drawn head to the desired flat formation. These shaping operations may be performed in any suitable manner, shaving machines being well known in the art. In connection with the shaving operation, the shoulder 23, which is slightly over-size, is machined down to true diameter.

Figure 12:
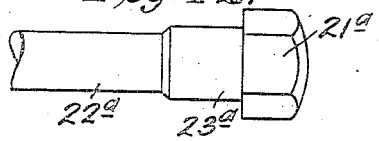
Figure 12 is a plan view of the completed blank.

This results in a finished blank which requires only pointing and threading to form a completed cap screw or bolt. The blank shown as an example in Fig. 12 is such a finished blank. It has a hexagon head 21$^a$, a shoulder 23$^a$ of final diameter and a shank 22$^a$ to be threaded, the shank differing in diameter from the shoulder by the amount the metal is to be displaced in threading. The completed cap screw is not illustrated as the threading step forms no part of the present invention. Threading may be accomplished in any suitable manner, but with the particular blank shown, threading by the method of the Senior patent referred to is assumed.

The method above described makes possible a cap screw or bolt having a strong shank, a head that is tough and not brittle and having hard facets capable of resisting deformation under the application of a tool. By forming a blank of the shape described and faceting it by a metal drawing operation the facets produced are uniformly true and there is a minimum of waste metal to be trimmed off.

Figure 5:
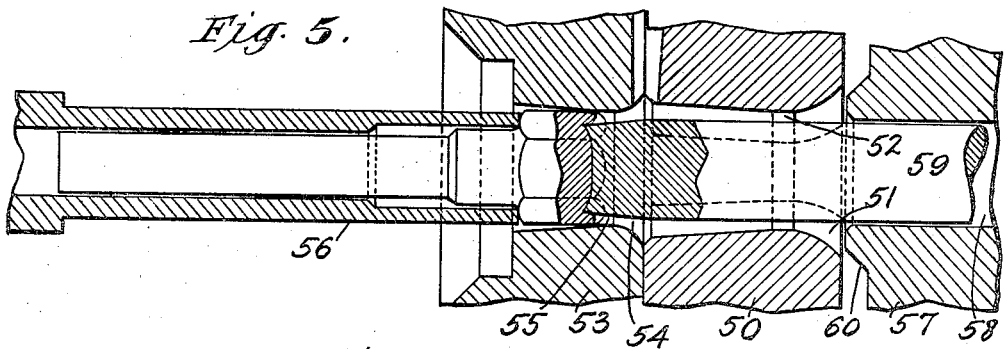
Figure 5 is a sectional view of apparatus for carrying out the step of shaping the head by a cold working operation.

The accompanying drawings illustrate, by way of example, apparatus capable of carrying out the shaping, e. g. faceting, of the head. Referring to Fig. 5, there is provided a leading draw die 50 having a mouth 51 for gradual reception of the head of the blank and a hexagonal drawing bore 52 of a size slightly larger than the size of the desired head. Behind the leading draw die 50 is a second draw die 53 arranged in tandem. This die has a mouth 54 and a hexagonal drawing bore 55 of the size of the faceted head to be produced, the bores of the two dies being coaxial. In the embodiment illustrated the difference in bore diameters is such that the second die reduces the head produced by the first draw by about ten thousandths of an inch for ½″ screws.

To hold the blank, there is provided a tubular blank holder 56 of a size to penetrate the die bores.

To force the head of a blank through the dies, there is provided a two-part pusher device. This comprises a pusher block 57 having a bore 58 coaxial with the bores of the two draw dies. Slidable in the bore 58 of the pusher block is a pusher plunger 59 having a tapered forward end and of a size to penetrate the bores of the draw dies. Assuming the pusher block and plunger drawn back from the position of Fig. 5 with the end of the plunger substantially coincident with the face of the boss 60 on the block, and assuming the holder 56 advanced to the front face of the leading die, a blank is inserted with its stem in the holder, thus presenting the base of the mushroom head to the die 50. The pusher device is then advanced toward the die as a unit until the pusher block 57 closely approaches the die 50, i. e. to the position of Fig. 5. The movement of the block then ceases and the plunger 59 is advanced alone. This movement of the pusher device forces the head of the blank through the successive dies to draw the metal of the head into hexagon shape as above described. It will be understood that the stroke of the plunger 59 is sufficient to move the blank beyond both dies and that the holder recedes as the blank advances. While the holder and pusher device may be operated by any suitable means, it may conveniently be accomplished by mechanism such as shown in my companion application, Serial No. 69,814, filed of even date herewith.

Certain features of the mechanism above described are claimed in said application Serial No. 69,814 and certain features of the product of the present method are claimed in a companion application filed of even date herewith, Serial No. 69,812.

What I claim is:

1. The method of producing a headed article such as a cap screw or bolt, which comprises forming a blank from cold drawn stock, said blank having a head thereon made by a cold upsetting of the metal, annealing the head of the blank without injuriously heating the stem of the blank to modify the crystalline structure produced by the cold drawing, and subsequently cold working the head to the desired shape.

2. The method of producing a headed article such as a cap screw or bolt, which comprises annealing the head of a headed blank and subsequently cold working the head to the desired shape.

3. The method of producing a headed article such as a cap screw or bolt which comprises forming a blank from cold drawn stock, said blank having a round head made by a cold upsetting of the metal, annealing the head, and subsequently cold working the head to a polygonal shape.

4. The method of producing a headed article such as a cap screw or bolt which comprises forming a blank from cold drawn stock, said blank having a round head made by a cold upsetting of the metal, annealing the head, and subsequently shaping the head by metal drawing.

5. The method of producing a headed article such as a cap screw or bolt which comprises forming a blank from cold drawn stock, said blank having a round head made by a cold upsetting of the metal, annealing the head, and subsequently hardening the outer surface of the head by cold drawing.

6. The method of producing a headed article such as a cap screw or bolt having a faceted head, which comprises forming a blank having a head substantially round in cross section and having a greater diameter at one end than at the other, and shaping the head of the blank by metal drawing, the draw of the metal being in a direction away from the part having the larger diameter.

7. The method of producing a headed article such as a cap screw or bolt which comprises forming a blank from cold drawn stock, said blank having a head made by a cold upsetting of the metal, heating the blank in such manner that the head of the blank reaches red heat while the remainder of the blank is kept from rising beyond black heat, thereby to anneal the head without injuriously heating the stem of the blank to modify the crystalline structure produced by the cold drawing, and subsequently cold working the head to form the desired shape.

8. The method of producing a headed article such as a cap screw or bolt which comprises forming a headed blank from cold drawn stock, dipping the head portion only of the blank in a heating bath to anneal the head without injuriously heating the stem of the blank to modify the crystalline structure produced by the cold drawing, and subsequently cold working the head to the desired shape.

In testimony whereof, I have hereunto set my hand.

ALVAN L. DAVIS.